US006728360B1

United States Patent
Brennan

(10) Patent No.: US 6,728,360 B1
(45) Date of Patent: Apr. 27, 2004

(54) CALL PROCESSING SOFTWARE, METHODS AND EQUIPMENT PROVIDING ENHANCED NOTIFICATIONS

(75) Inventor: Paul M. Brennan, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 595 days.

(21) Appl. No.: 09/609,281

(22) Filed: Jun. 30, 2000

(51) Int. Cl.[7] ................................................ H04M 3/42
(52) U.S. Cl. ............................ 379/211.04; 379/201.01
(58) Field of Search ........................ 379/211.02, 211.04, 379/201.01, 212.01, 88.2, 127.01, 142.04

(56) References Cited

U.S. PATENT DOCUMENTS

| | | | | |
|---|---|---|---|---|
| 5,329,578 A | | 7/1994 | Brennan et al. .............. | 379/67 |
| 5,511,113 A | * | 4/1996 | Tasaki et al. ................ | 379/112 |
| 5,548,636 A | | 8/1996 | Bannister et al. ........... | 379/201 |
| 5,550,909 A | * | 8/1996 | Chanda et al. .............. | 379/220 |
| 5,802,160 A | | 9/1998 | Kugell et al. ................ | 379/211 |
| 5,905,774 A | | 5/1999 | Tatchell et al. ........... | 379/88.04 |
| 6,005,870 A | * | 12/1999 | Leung et al. ................ | 370/466 |
| 6,011,843 A | | 1/2000 | Hochman et al. ........... | 397/211 |
| 6,028,922 A | * | 2/2000 | Deutsch et al. ............. | 379/211 |
| 6,603,848 B1 | * | 8/2003 | Winnett .................. | 379/215.01 |

* cited by examiner

Primary Examiner—Creighton Smith

(57) ABSTRACT

Call processing software, methods and equipment providing enhanced notifications are disclosed. Personal agent call processing software executing at a personal agent processor uses existing calling line identification display and calling party name display (CLID/CPND) fields associated with telephony call signals provide these enhanced notification. For example, events that are unrelated to incoming calls may be signaled. Similarly, information derived from incoming CLID information in accordance with subscriber preferences may be provided to a destination. As well, the name or number of the called party and information derived from the CLID/CPND information of the calling party may be provided to a destination. Conveniently, existing telephone appliances capable of display of CLID/CPND information may thus be used to receive a wide variety of notifications.

20 Claims, 6 Drawing Sheets

CALL PROCESSING SOFTWARE, METHODS AND EQUIPMENT PROVIDING ENHANCED NOTIFICATIONS

FIELD OF THE INVENTION

The present invention relates to personal communication services, and more particularly to call processing software, methods and equipment providing enhanced notifications of incoming calls and events.

BACKGROUND OF THE INVENTION

In recent years, telephony equipment has become increasingly sophisticated. Most modern day switching centers actually include, or are coupled to, computing facilities. As a consequence, telephone subscribers have been offered a variety of previously unavailable services. For example, subscribers are commonly offered such services as call waiting, calling line identification display and calling party name display (CLID/CPND), call forwarding, residential voice mail, and distinctive ringing.

More recently, telephone network sophistication has provided subscribers the flexibility of having personal call handling software process incoming calls and originate outgoing calls on behalf of the user. Such features are often referred to as personal communications services (PCS). A configured piece of call handling software making such PCS possible is often referred to as a personal agent. Personal agents are more particularly described in U.S. Pat. Nos. 5,329,578 and 5,905,774, the contents of which are hereby incorporated by reference. Personal agents may, for example, process incoming calls based on a set of rules and information including a calling party's number; the called number; the time of call; or additional information requested from the caller.

One notable benefit of using a personal agent is the ability to process calls from different calling parties differently. So, for example, personal agents may reject calls from undesirables, forward calls from important callers to private numbers, and the like. Another notable benefit of a personal agent is the ability to locate a called party at several locations in response to an incoming call. U.S. Pat. Nos. 6,011,843 and 5,802,160, for example, disclose systems having the facility to signal several possible telephone numbers simultaneously, in response to receiving an incoming call.

Unfortunately, existing personal agents have not made optimal use of some existing call handling features, such as the CLID/CPND facilities, with new call processing features. Similarly, personal agents have not effectively exploited the availability of such features.

For example, conventional personal agents typically fail to properly notify the called party of the identity of an incoming call. So, call notifications originated by the personal agents are typically accompanied by CLID/CPND information associated with the personal agent processor, instead of the CLID/CPND associated with the originating call. Moreover, even when such call notifications are originated by a personal agent, the CLID/CPND information is typically limited to that associated with the incoming call.

Accordingly, improved telephony software, equipment and methods allowing improved personalized telephony services are desirable.

SUMMARY OF THE INVENTION

In accordance with an aspect of the present invention, existing CLID/CPND fields associated with telephony call signals are used to provide a wide variety of notifications. For example, events that are unrelated to incoming calls may be signaled. Similarly, information derived from incoming CLID information in accordance with subscriber preferences may be provided to a destination.

In accordance with another aspect of the invention, information including the name or number of the called party and information derived from the CLID/CPND information of the calling party may be provided to a destination. Recipients at the destination may thus easily determine the call's origin and intended recipient. This is particularly beneficial for calls forwarded to destinations away from the intended call recipient's usual location.

Conveniently then, existing telephone appliances capable of display of CLID/CPND information may be used to receive and display a wide variety of notifications.

Therefore, in accordance with an aspect of the present invention, a method of processing an incoming call at a processor providing personal communications services to a telephony subscriber, includes receiving an indicator of the incoming call, including incoming call information indicative of a source of the incoming call; forming calling party information at the processor based on the incoming call information and a stored user preference; and originating a signal indicative of the incoming call, including the calling party information directed to a pre-programmed destination, so that an identifier of the call chosen by the subscriber may be displayed at the destination.

In accordance with another aspect of the present invention, a telephony switching center, within a telephone network, is operable to: receive an indicator of an incoming call destined for a subscriber serviced by the switching center, the indicator including incoming call information indicative of a source of the incoming call; form calling party information at the processor based on the incoming call information and a stored user preference; and originate a signal indicative of the incoming call including the calling party information, directed to a pre-programmed destination, so that an identifier of the calling party chosen by the subscriber may be displayed at the destination.

In accordance with another aspect of the present invention, a computer readable medium stores computer executable instructions, that when loaded at a processor providing personal communications services to a telephony subscriber, adapt this processor to receive an indicator of the incoming call, including incoming call information indicative of a source of the incoming call; form calling party information at the processor based on the incoming call information and a stored user preference; and originate a signal indicative of the incoming, including the calling party information directed to a pre-programmed destination, so that an identifier of the calling party chosen by the subscriber may be displayed at the destination.

In accordance with yet a further aspect of the present invention, a method of providing an indicator of a trigger event, unrelated to receipt of a current call for the subscriber at a processor providing personal communications services to a telephony subscriber, includes originating a signal including information identifying the event to a pre-programmed destination so that the information identifying the event may be displayed at a calling line display at a telephone appliance associated with the pre-programmed destination.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In figures which illustrate by way of example only, embodiments of the invention.

DETAILED DESCRIPTION

Figure 1:
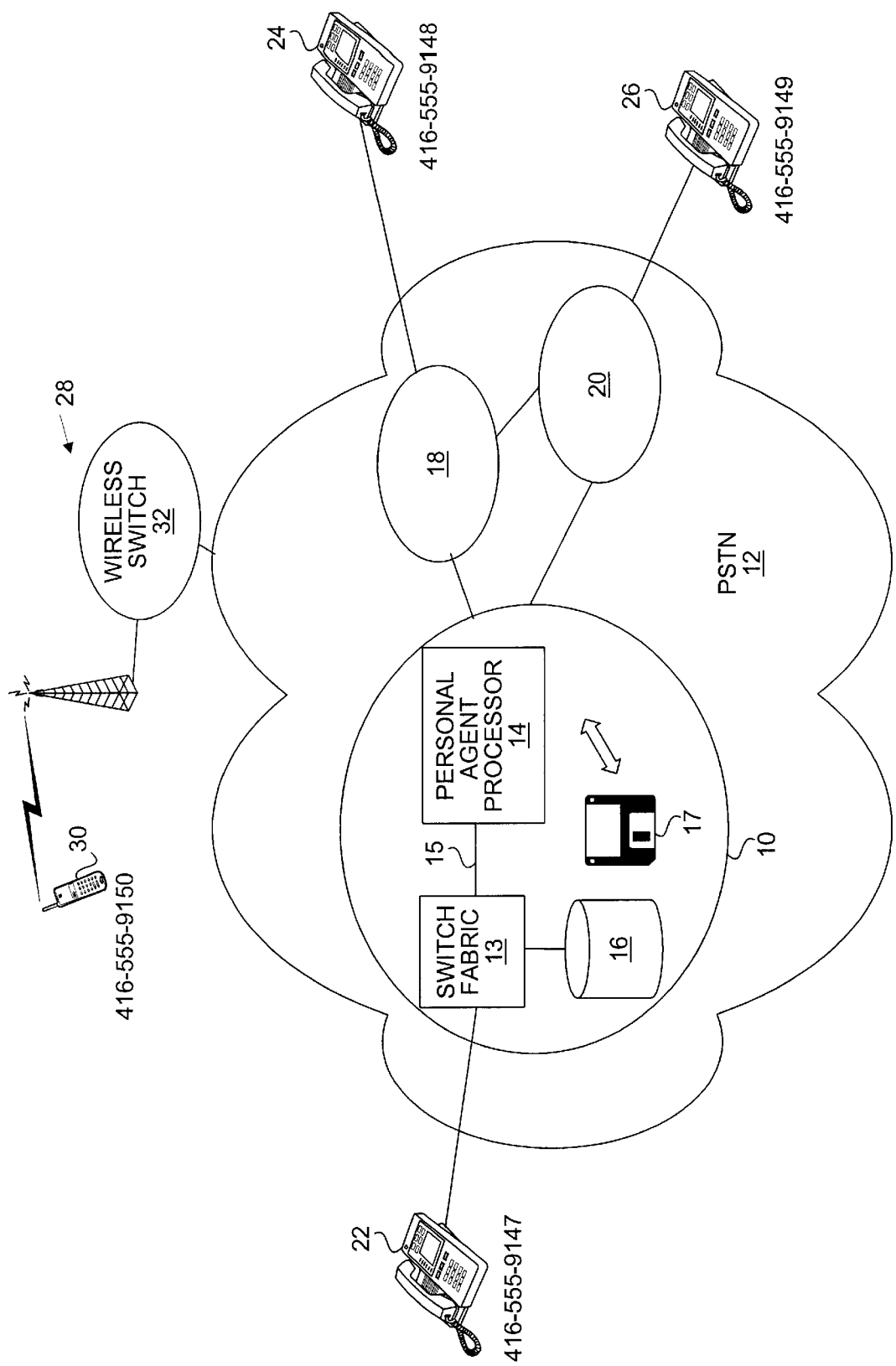
FIG. 1 is a simplified schematic of a telephone network, including an example switching center exemplary of an embodiment of the present invention.

FIG. 1 illustrates a telephony switching center 10 exemplary of an embodiment of the present invention. Switching center 10 forms part of the public switched telephone network (PSTN) 12 and executes personal call handling software, exemplary of the present invention. Switching center 10 may be a central office (CO) in the PSTN 12, providing telephony service to interconnected subscribers such as those serviced by exemplary subscriber set 22. Switching center 10 also preferably acts as a conventional signaling point (SP) within a PSTN signaling network, such as a conventional SS7 network. As illustrated, switching center 10 preferably includes a switch fabric 13, a personal agent processor 14, and a switch database 16.

Alternatively, switching center 10 need not be a CO or SP, but could be a smaller switching center such as a private branch exchange, or the like, having suitable connections to PSTN 12.

Switching center 10 is in communication with exemplary remote switching centers 18 and 20, preferably by way of traffic carrying trunks, and by way of conventional SS7 signaling links. Switching centers 18 and 20 are similar to switching center 10, and may also act as COs and SPs for subscribers associated with telephone sets 24 and 26, respectively.

A further wireless telephone network 28, including wireless switch 32 in communication with PSTN 12 is also illustrated. Wireless hand set 30 is in communication with network 28 to place and receive calls by way of this network in a conventional manner.

Each of subscriber sets 22, 24, 26 and 30 is preferably associated with its own network addresses (telephone number), that permits contact by others through PSTN 12. Each of sets 22, 24 and 26 is preferably a conventional telephone appliance including a display capable of display CLID/CPND information provided by way of PSTN 12. As will be appreciated, for receipt of CLID/CPND information, sets 22, 24 and 26 could be dedicated CLID/CPND appliances, known to those of ordinary skill.

Switch fabric 13 interconnects traffic carrying channels between center 10 and remote centers such as switching centers 18 and 20.

Personal agent processor 14 of switching center 10 preferably allows the provision of a personal call processing software to subscribers on the PSTN 12. As such, personal agent processor 14 includes suitable memory for software including data and program instructions, exemplary of an embodiment of the present invention. Such software may be loaded from a computer readable medium, such as computer readable medium 17. Personal agent processor 14 may be in communication with switching fabric 13 by way of interface 15, which may be an integrated services digital network (ISDN) primary rate interface (PRI). In the described embodiment, personal agent processor 14 hosts software executed in response to calls originated by or directed to exemplary subscribers at set 22. Preferably, personal agent processor 14 forms part of switching center 10. However, a person of ordinary skill in the art will readily appreciate that such a personal agent processor could be located remotely from switching center 10, and thus could be operated by parties other than conventional PSTN 12 carriers. As will also be appreciated, personal agent processor 14 typically provides services to a plurality of subscribers that may not all be associated with the same switching center.

Personal agent processor 14 under software control, may provide a variety of telephony services to subscribers, including those services detailed in U.S. Pat. No. 5,329,578. Services may include scheduled notification, pager notification, urgency notification, and the like. Moreover, personal agent processor 14 may receive signaling information from other service providing devices in communication with PSTN 10. For example, processor 14 could receive signaling information from a subscriber voice messaging system, indicative of incoming messages. Processor 14 could additionally be adapted to allow a subscriber to place outgoing calls.

Database 16 contains subscriber information about telephone subscribers, including information associated with a subscriber at set 22. Database 16 may be accessed by agent processor 14. As will be appreciated, database 16 need not be located at switching center 10, but could be located elsewhere and be in communication with the signaling network used by switching center 10. Alternatively, database 16 could in communication with another data network coupled to processor 14, or could be co-located with processor 14 remote from switching center 10.

Figure 2:
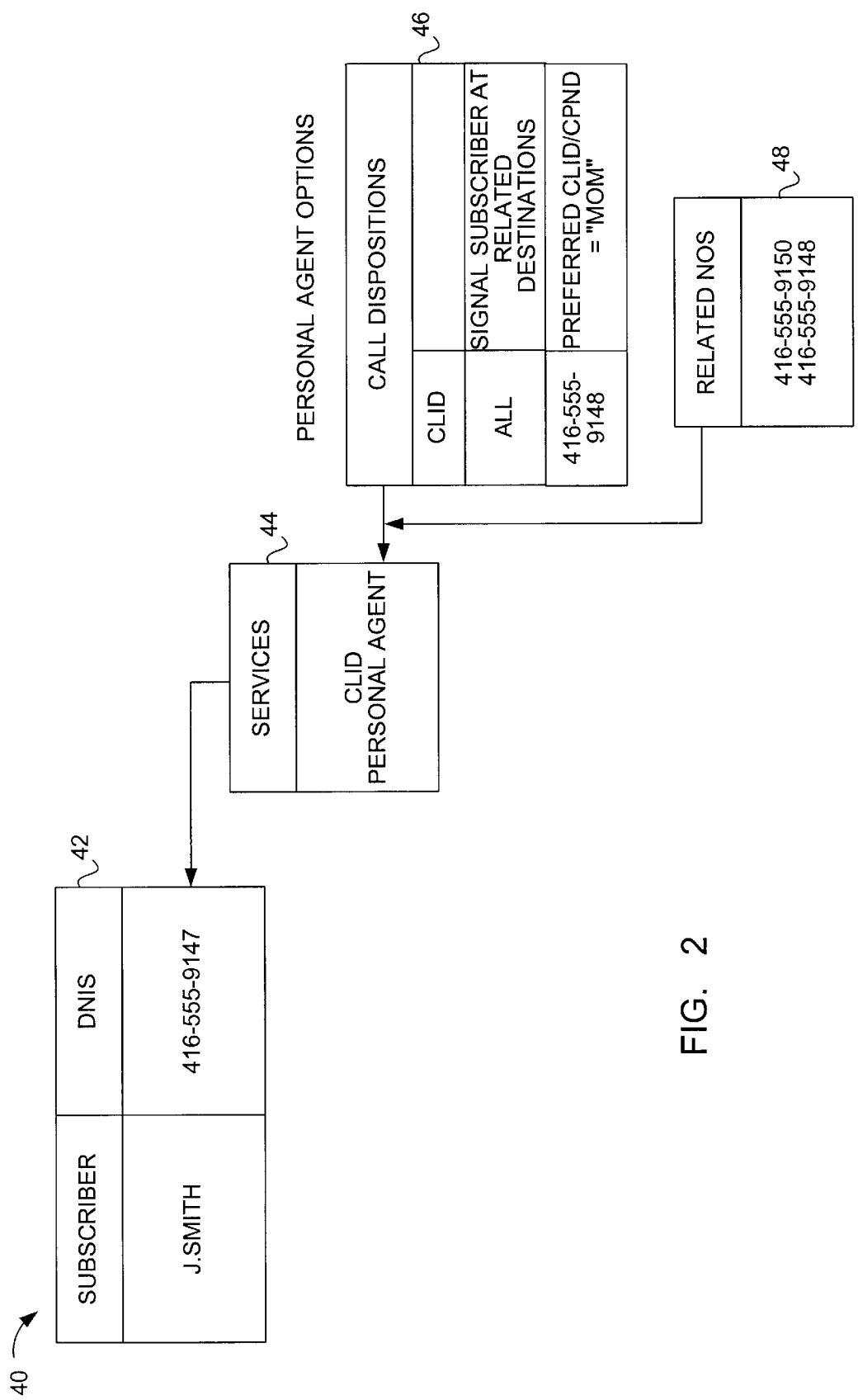
FIG. 2 is a block diagram of a data record stored within a database at the example switching center of FIG. 1.

An exemplary data record 40 associated with the subscriber associated with set 22 is illustrated in FIG. 2. Record 40 preferably includes an identifier of the subscriber, by telephone number and name in field 42; a list of services subscribed to by the subscriber in field 44; secondary telephone numbers associated with the subscriber in field 48; control parameters for any personal agent associated with the subscriber in field 46. As will be appreciated, record 40 could easily contain additional information used to provide other services, and could be organized in many ways readily apparent to those of ordinary skill in the art. Portions of record 40 (such as fields 46 and 48) may be modified by the subscriber associated with set 22 through use of a conventional voice prompted or similar interface.

Similar records may also be maintained for other subscribers serviced by database 16 (FIG. 1). Database 16 could optionally also contain software executed by processor 14, which could be downloaded to processor 14, as required.

Figure 3A:
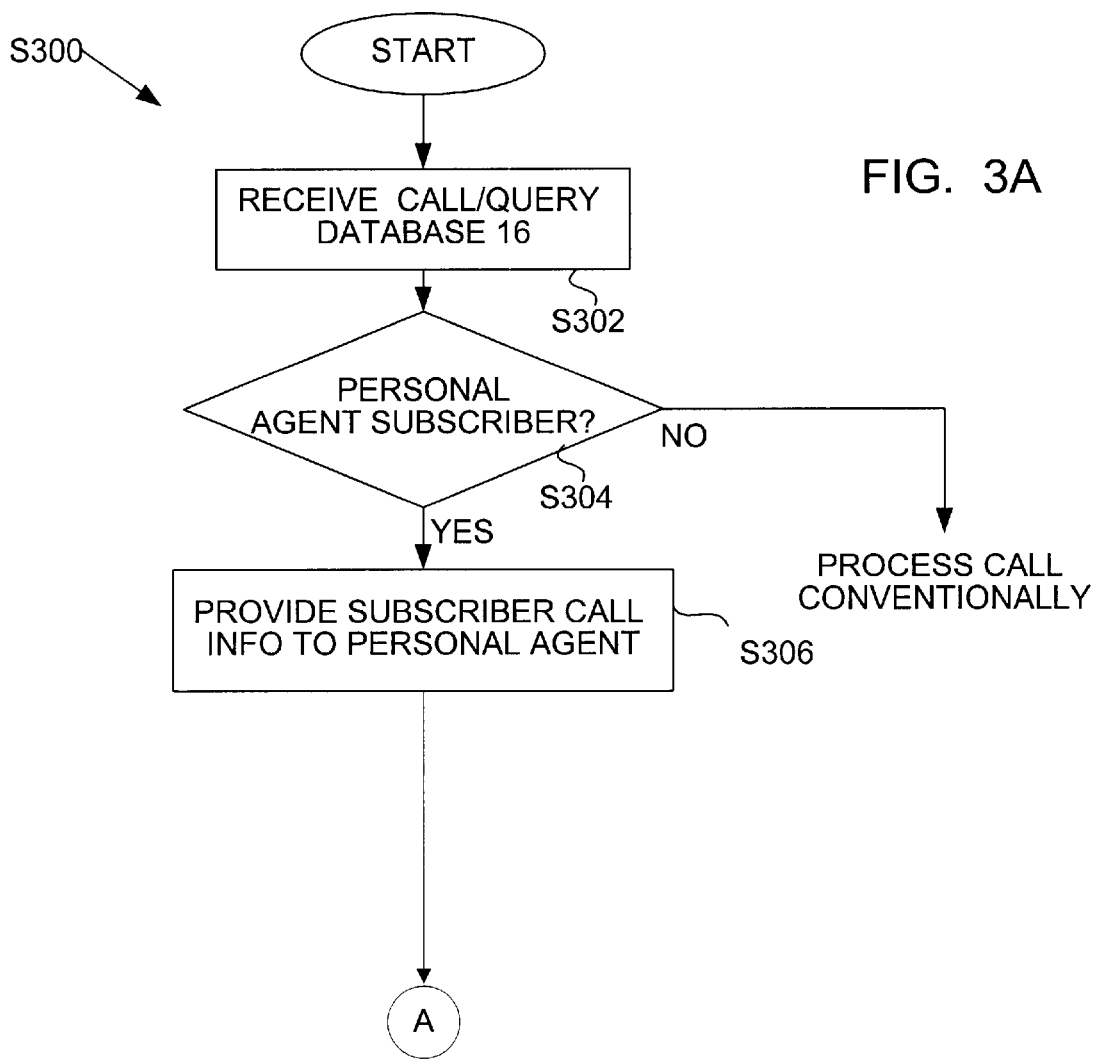
FIGS. 3A and 3B is a flow chart, illustrating steps performed at the example center of FIG. 1, and exemplary of an embodiment of the present invention.
Figure 3B:
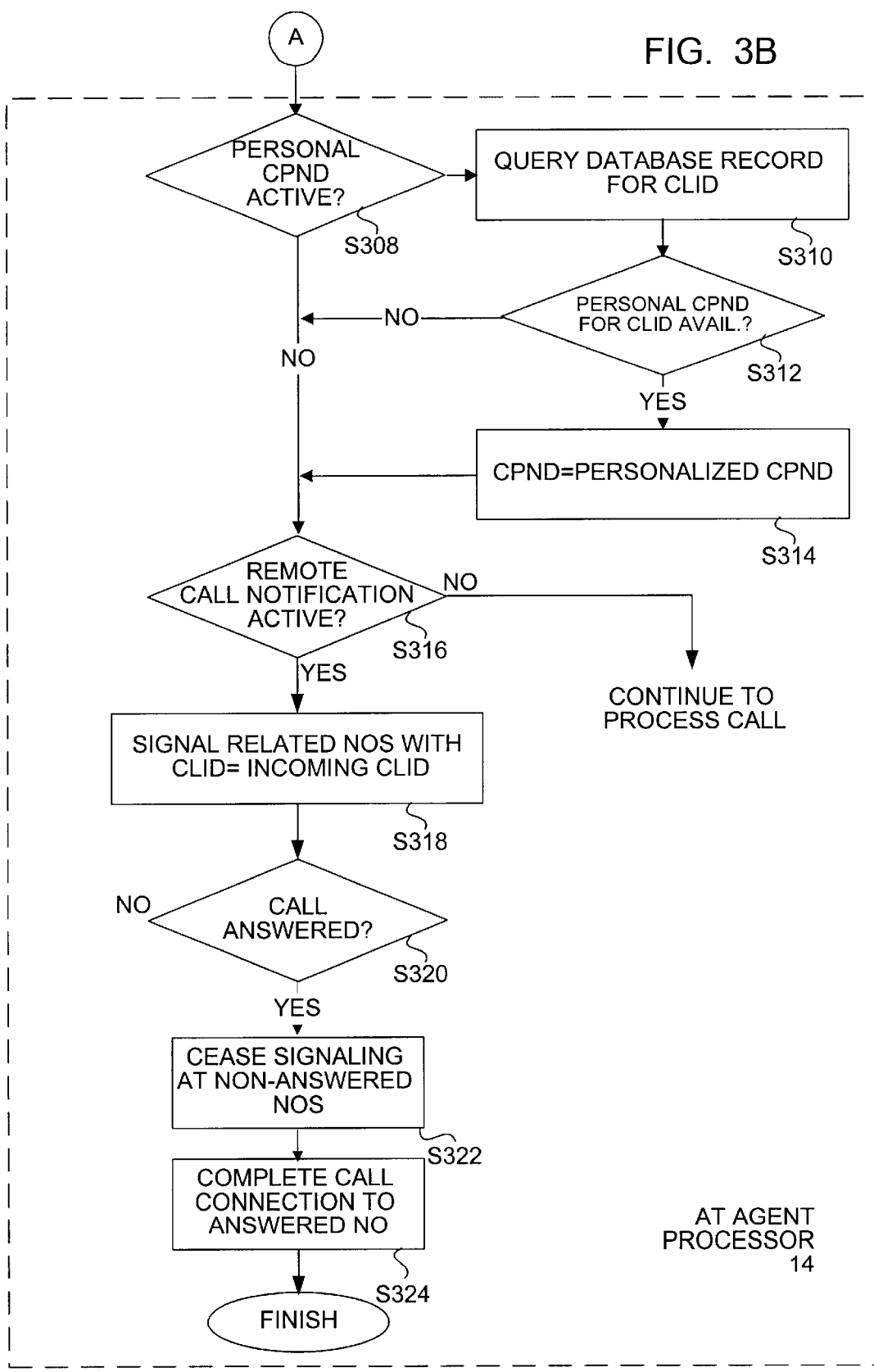

In operation, steps S300 performed by switching center 10 in response to receiving an incoming call are illustrated in FIGS. 3A and 3B. Specifically, switching center 10 responds to receiving an indicator of an incoming call directed to a dial number associated with set 22, by querying database 16 and record 40 to assess features subscribed to by an associated customer in step S302. In the event a customer subscribes to a "personal agent" service as determined in step S304, signaling information about the incoming call is communicated to personal agent processor 14 in step S306. Specifically, the called number (DNIS) as well as CLID/CPND information associated with the incoming call are provided to agent processor 14 by way of interface 15. In response, personal agent processor 14 commences execution of a program allowing for handling of the call. Using the associated incoming call information passed to agent processor 14, as well as other available information, personal agent processor 14 may process the call in accordance with a rule set (not shown) preferably stored within record 40 of database 16. The rule set may control the agent processor 14 to process the call using any one or more known disposition options. For example, agent processor 14 may initiate a distinctive ring based on the DNIS at subscriber set 22. Agent processor 14 may forward the call to another subscriber line, or personal agent processor 14 may announce the name and number of the calling party. As will be further appreciated, the rule set used by personal agent processor may vary in accordance with a pre-programmed schedule. For example, the rule set used during weekdays may differ from that used on weekends; the rule set used mornings may differ from that used evenings; and so on.

Personal agent processor 14, may also for example, provide a preferred name calling party information to the called party. So, if preferred name calling identification services are subscribed to, as determined in step S308 (FIG. 3B), agent 14 queries record 40 of database 16 to determine if the called party should be identified by a preferred name in steps S310 and S312. If so, the CLID/CPND information associated with the incoming call is modified at agent 14 in step S314 to reflect the personalized name. Thus, using the example record 40 of FIG. 2, calling party information for incoming calls associated with the calling number CLID=416-555-9147 are modified to reflect that these calls originated with "MOM". CPND information associated with an incoming call is accordingly modified, so that when CLID/CPND information is provided and further utilized, it will represent the personalized preference of the personal agent subscriber.

Additionally, personal agent processor 14 is further particularly well suited to remotely notifying a subscriber of an incoming call at remote destinations. That is, processor 14 may be initially configured to locate a subscriber at a list of possible associated destinations identified in field 48 of record 40 in FIG. 2. Each of these destinations has an associated subscriber set identified with a telephone number. This list may, for example, be pre-programmed and stored at database 16. If such remote notification is active at processor 14, as determined in step S316, processor 14 under software control attempts to signal the called party at the remote destinations associated with numbers stored within field 48 in steps S318–S324. In order to quickly locate the called party, personal agent processor 14 preferably signals all associated numbers concurrently in step S318. That is, personal agent processor 14 through an interconnected switch fabric 13 may cause switching center 10 to signal arrival of an incoming call at all associated telephone numbers simultaneously, or near simultaneously. Conveniently, personal agent processor 14 does not forward the incoming call, but instead originates signaling to other sets by way of the interconnected signaling network. Of course, while not as convenient, processor 14 could signal the remote destinations sequentially.

So that recipients know at the multiple sets the identity of the caller originating the incoming call, personal agent processor 14 may ensure that signals to the multiple signaled sets include the CLID and optionally CPND now associated with the incoming call. If the CPND was modified, in steps S314, the provided CPND may reflect this modification. Optionally, personal agent processor 14 may form such signals based on the incoming CLID/CPND information and a rule set (not shown) pre-programmed by a user. Moreover, the signals could similarly be modified based on the particular destination being signaled. So, the signal could include the name of the subscriber to whom the call was placed and thereby accordingly alert other subscribers at recipient sets. Moreover, in order to alert individuals at remote sets that the call has been pre-processed by a personal agent, the CLID information may be modified, or appended with an identifier of the personal agent. For example, incoming CLID information could be prepended or appended with the prefix or suffix "P". Of course, the scope of modification to the CLID/CPND information associated with the signal will be limited by the format of conventional CLID/CPND information used as part of the signaling information, as appreciated by persons skilled in the art.

Optionally, in the event an incoming call is not associated with CLID/CPND information, the personal agent processor 14 could prompt an associated caller for his or her name and number, which could be input by voice or by DTMF keystrokes. Information input by way of spoken voice could be converted to text using conventional speech recognition software, also optionally executed at processor 14. This information, in turn, could be included in the signaling information provided to remotely signaled sets.

Further, personal agent processor 14 may be programmed to provide modified CLID/CPND information based on an additional pre-programmed rule set or prompt a caller for further information. A derivative of this prompted information, in turn, could be included in the signaling information provided to remotely signaled sets, such as sets 24 and 30 in the example to be described.

As soon as one of the remote sets answers the incoming call, signaling by personal agent processor 14 may cease. As well, the incoming call may be bridged by the traffic carrying portion of the PSTN to the recipient at the answered telephone set.

Figure 4:
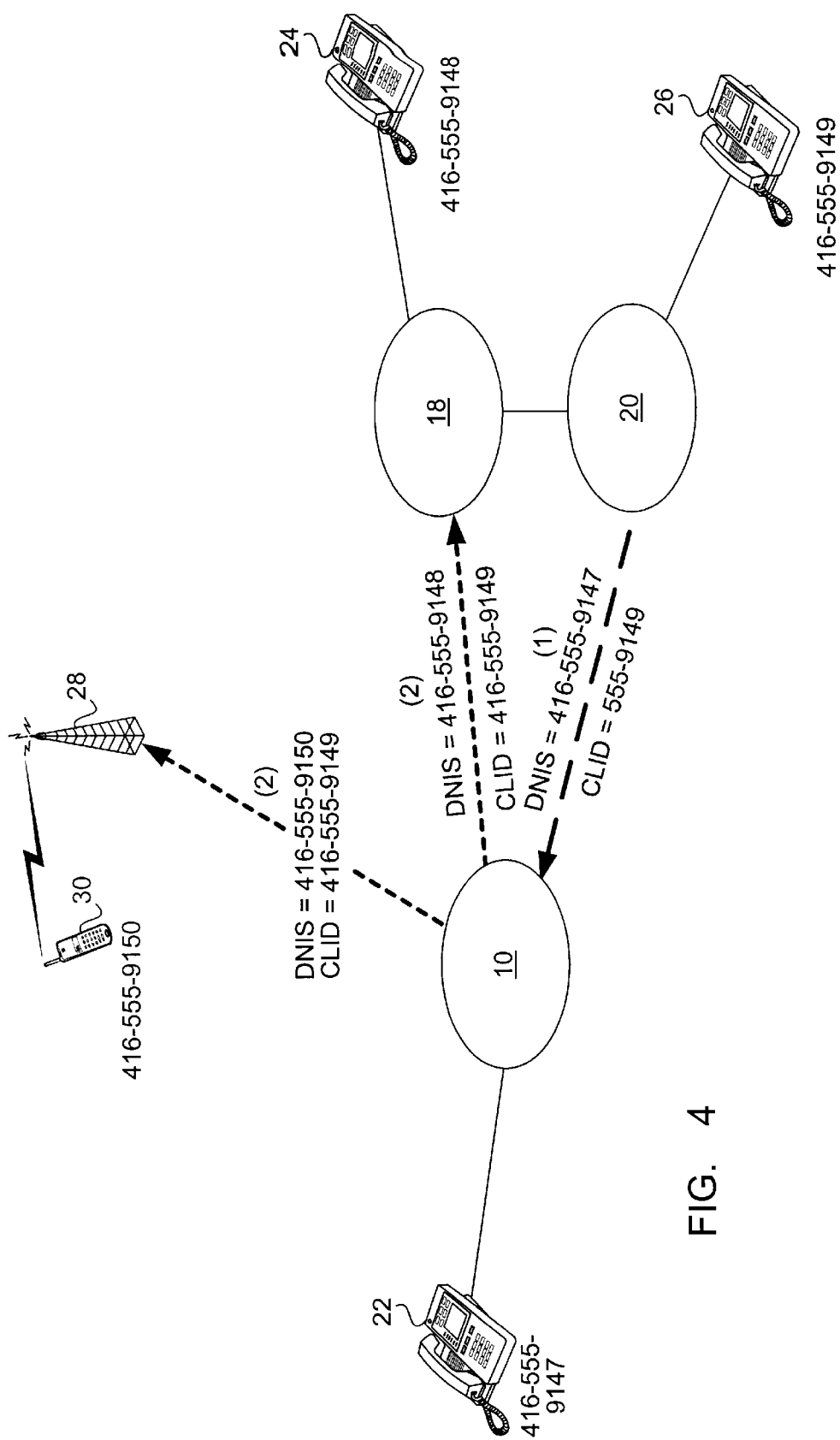
FIG. 4 is a further schematic view of the telephone network of FIG. 1, illustrating call handling in a manner exemplary of an embodiment of the present invention.

For example, as schematically illustrated in FIG. 4 a caller associated with set 26 (FIG. 1) may initiate a call to a caller at set 22, by picking up the hand set and dialing the number associated with set 26. Switching center 20, in turn signals switching center 10 by way of an SS7 network interconnecting the centers 10 and 20. Switching center 10 reacts to the incoming signal by determining if a subscriber at set 22 subscribes to personal agent service.

Assuming the subscriber does, signaling information associated with the call is passed to personal agent processor 14. As illustrated DNIS=416-555-9147, and CLID=416-555-4198 are passed to processor 14. Processor 14, in turn determines that the personal agent should provide remote call notification by querying record 40 (FIG. 2) of database 16 (FIG. 1). Processor 14, in turn, extracts the associated telephone numbers stored in field 48 identifying remote destination telephone set 24 and wireless hand set 30.

Next, processor 14 originates signals to destination telephone set 24 and hand set 30. The signals preferably include the CLID of the incoming call (ie. 416-555-9149). The CLID may optionally be accompanied by a "P", prepended with a "0"or accompanied by a similar indicator, indicating that the call has been pre-processed by an agent at processor 14. Optionally, the CPND for the call may be modified to reflect the subscriber's pre-programmed preferences. In response, destination sets 24 and 30 ring, and if equipped with a CLID display, display the phone number and name associated with set 26. Once set 24 or 30 is answered, signaling at the other set is terminated. As will be appreciated, the intervention of the personal agent may thus be entirely transparent to a caller.

Figure 5:
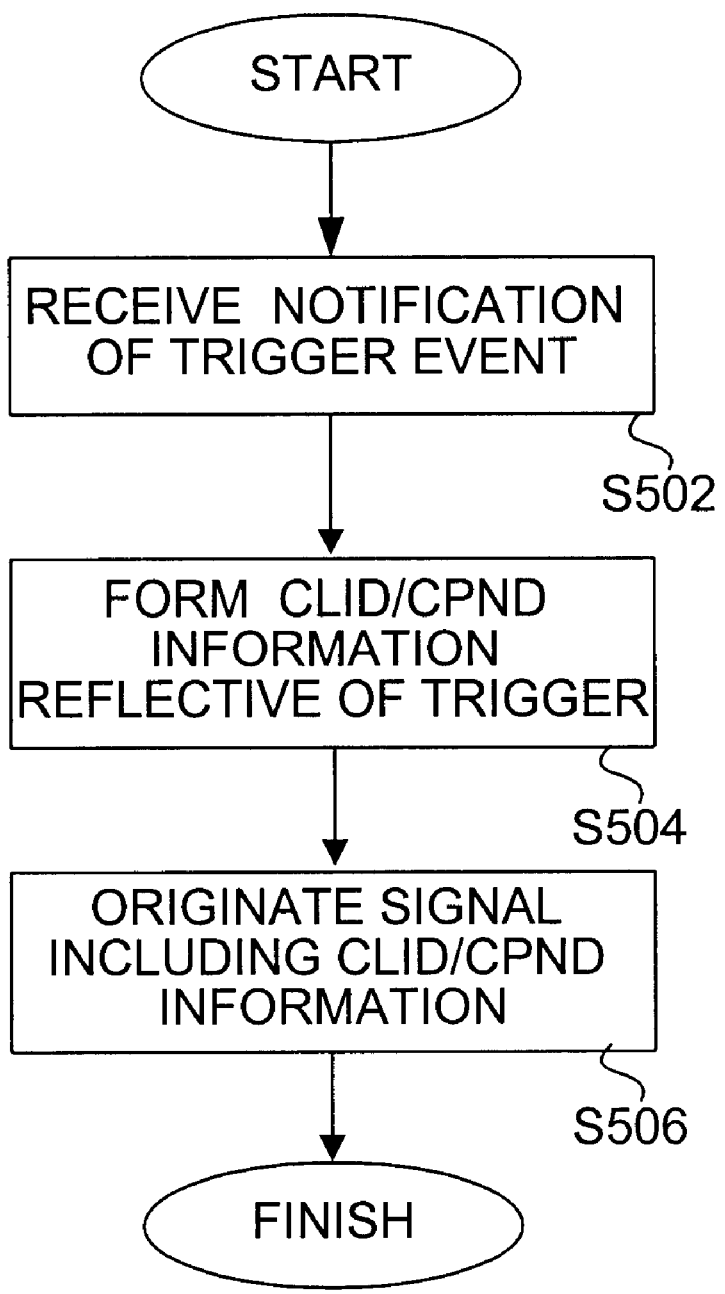
FIG. 5 is a flow chart, illustrating steps performed at the example center of FIG. 1, and exemplary of another aspect of the present invention.

In a manner exemplary of the present invention, personal agent 14 may additionally periodically signal a subscriber of non-call related events through use of conventional CLID/CPND signal portions. The information may thus conveniently be displayed at any telephony appliance, otherwise capable of displaying CLID/CPND information. Specifically, as illustrated in FIG. 5, steps S500 may be performed under software control, upon occurrence of a trigger event provided to exemplary personal agent processor 14 in step S502. In response, this personal agent processor 14 could form and dispatch a conventional call origination signal for receipt by a recipient telephone in steps S504 and S506. One or more dial numbers of the recipient telephone may be stored within database 16. Information to be conveyed, typically reflective of the trigger event may be included in the CLID/CPND fields of the originating signal in step S504. For example, the trigger event invoking performance of step S502 may be the change of a schedule used by the personal agent or a scheduled reminder programmed by the subscriber and maintained by the personal agent. Alternatively, the trigger event may be receipt of an indicator of a received message at another messaging system used by the subscriber. The other messaging system might be a voice messaging system, or an electronic mail system, or any other suitable system. The trigger event may thus be generated by personal agent software executing at processor 14 or as the result of signals provided by other equipment to processor 14. Again processor 14 could receive such signals by way of the interconnected SS7 signaling network, or otherwise as understood by those of ordinary skill. CLID/CPND fields for an originating signal may accordingly reflect the event. In case of a changed schedule, the CLID/CPND information may include text notifying of the personal agent schedule change. Similarly, if the triggering event is a received message, received at a voice messaging system, the message may include text reflecting a newly received call. CLID/CPND information may additionally include an identifier of the personal agent subscriber, so that the remote device may be notified that the signaling message is intended for a particular subscriber. Signaling information is dispatched to one or more recipient telephone numbers associated with conventional telephone appliances capable of CLID/CPND display in step S504. The signaling information may be accompanied by a ring signal for the notified appliance. Preferably, this ring signal is a distinctive ring tone further alerting a recipient that the CLID/CPND information is not associated with a call, but is instead associated with an event. Conveniently then, a personal agent service subscriber may be notified of trigger events at one or more pre-programmed locations.

Of course, the above described embodiments, are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. At a processor providing personal communications services to a telephony subscriber, a method of processing an incoming call comprising:

receiving an indicator of said incoming call, including incoming call information indicative of a source of said incoming call;

forming calling party information at said processor based on said incoming call information and a stored user preference, said calling party information including an identifier of said source of said incoming call, said identifier chosen by said subscriber and included in said stored user preference;

originating a signal indicative of said incoming call, including said calling party information directed to a pre-programed destination, so that said identifier of said calling party chosen by said subscriber may be displayed at said destination.

2. The method of claim 1, wherein a plurality of signals each including said calling party information are originated to a plurality of pre-programmed destinations concurrently whereby said calling party information may be displayed at each of said plurality of destinations.

3. The method of claim 2, further comprising:

in response to one of said plurality of destinations picking up said call, ceasing to signal the remainder of said plurality of destinations.

4. The method of claim 2, further comprising:

including in each of said plurality of signals an indicator that said incoming call is being processed at said processor.

5. The method of claim 2, wherein said plurality of signals are forwarded by way of a telephony signaling network.

6. The method of claim 1, wherein said signal comprises dialed number information associated with said incoming call.

7. A telephony switching center, within a telephone network, operable to:

receive an indicator of an incoming call destined for a subscriber serviced by said switching center, said indicator including incoming call information indicative of a source of said incoming call;

form calling party information at said processor based on said incoming call information and a stored user preference, said calling party information including an identifier of said source of said incoming call, said identifier chosen by said subscriber and included in said stored user preference; and originate a signal indicative of said incoming call including said calling party information, directed to a pre-programmed destination, so that said identifier of said calling party chosen by said subscriber may be displayed at said destination.

8. The telephony switching center of claim 7, interconnected with a signaling network forming part of the public switched telephone network, wherein said signal is dispatched by way of said signaling network.

9. Computer readable medium storing computer executable instructions, that when loaded at a processor providing personal communications services to a telephony subscriber, adapt said processor to:

receive an indicator of said incoming call, including incoming call information indicative of a source of said incoming call;

form calling party information at said processor based on said incoming call information and a stored user preference, said calling party information including an identifier of said source of said incoming call, said identifier chosen by said subscriber and included in said stored user preference; and originate a signal indicative of said incoming call, including said calling party information directed to a pre-programed destination, so that said identifier of said calling party chosen by said subscriber may be displayed at said destination.

10. At a processor providing personal communications services to a telephony subscriber, a method of providing an indicator of a trigger event, unrelated to receipt of a current call for said subscriber, said method comprising:

originating a signal including information identifying said event to a pre-programmed destination so that said information identifying said event may be displayed at a calling line display at a telephone appliance associated with said pre-programmed destination.

11. The method of claim 10, wherein said trigger event comprises receipt of a message at a messaging system associated with said subscriber.

12. The method of claim 11, wherein said message comprises an electronic mail message or a voice mail message.

13. The method of claim 10, wherein said trigger event comprises a changeover in operations of said processor in accordance with an operating schedule used by said processor.

14. The method of claim 10, wherein said trigger event comprises a pre-programmed reminder for said subscriber maintained by said processor.

15. The method of claim 10, wherein said signal comprises a distinctive ring signal to be provided to said appliance.

16. At a processor providing personal communications services to a telephony subscriber, a method of processing an incoming call comprising:

receiving an indicator of said incoming call, including incoming call information indicative of a source of said incoming call;

forming calling party information at said processor based on said incoming call information and a stored user preference, said calling party information including an identifier of said source of said incoming call, said identifier chosen by said subscriber and included in said stored user preference;

originating a plurality of signals each including said calling party information to a plurality of pre-programmed destinations concurrently whereby said calling party information maybe displayed at each of said plurality of destinations.

17. The method of claim 16, further comprising:

in response to one of said plurality of destinations picking up said call, ceasing to signal the remainder of said plurality of destinations.

18. The method of claim 16, further comprising:

including in each of said plurality of signals an indicator that said incoming call is being processed at said processor.

19. The method of claim 17, wherein said plurality of signals are forwarded by way of a telephony signaling network.

20. The method of claim 16, wherein said signal comprises dialed number information associated with said incoming call.

* * * * *

UNITED STATES PATENT AND TRADEMARK OFFICE
CERTIFICATE OF CORRECTION

PATENT NO. : 6,728,360 B1  
DATED : April 27, 2004  
INVENTOR(S) : Brennan, Paul It is certified that error appears in the above-identified patent and that said Letters Patent is hereby corrected as shown below:

Column 10,
Line 26, delete "The method of claim 17" and substitute therefor -- The method of claim 16 --

Signed and Sealed this

Third Day of August, 2004

JON W. DUDAS
*Acting Director of the United States Patent and Trademark Office*